United States Patent [19]

Austin et al.

[11] Patent Number: 4,797,619

[45] Date of Patent: Jan. 10, 1989

[54] METHOD AND APPARATUS FOR MEASURING SPATIAL PROFILES OF ENERGY BEAMS

[75] Inventors: Richard L. Austin, Del Mar; Herbert J. Otto; Frank L. Jones, both of San Diego, all of Calif.

[73] Assignee: EG&G Gamma Scientific Incorporated, San Diego, Calif.

[21] Appl. No.: 25,897

[22] Filed: Mar. 13, 1987

[51] Int. Cl.⁴ .............................................. G01R 31/24
[52] U.S. Cl. ..................................... 324/409; 324/404; 356/406; 358/218
[58] Field of Search .................... 324/404, 409, 405; 358/218, 219; 356/121, 124.5, 406

[56] References Cited

U.S. PATENT DOCUMENTS

| | | | |
|---|---|---|---|
| 3,649,907 | 3/1972 | Youngbluth, Jr. | 324/404 |
| 3,657,550 | 4/1972 | Brown et al. | 324/404 X |
| 4,141,043 | 2/1979 | Liu | 358/219 |
| 4,220,919 | 9/1980 | Ruth | 324/404 |
| 4,408,163 | 10/1983 | Burr et al. | 324/404 |

OTHER PUBLICATIONS

Optical Radiation News (by EG&G Gamma Scientific, Inc.—dated Spring 1983).
A Unique Technique for Measuring Spatial Profiles of Color CRT Beams (by EG&G Gamma Scientific, Inc.—dated Sep. 5, 1986).

Primary Examiner—Reinhard J. Eisenzopf
Assistant Examiner—Robert W. Mueller
Attorney, Agent, or Firm—Finnegan, Henderson, Farabow, Garrett & Dunner

[57] ABSTRACT

An apparatus and method for measuring the spatial characteristics of color CRTs includes the scanning of an image of a white vertical line with a knife edge aperture and integrating the intensity values at each position of the knife edge. The centroids of the beams of the CRT are found by determining the X coordinates of the 50% points of the Y axis of the integral data, and the spatial line profiles are determined by differentiating the integral data. The integral data may be fitted to a Gaussian curve prior to analysis.

37 Claims, 8 Drawing Sheets

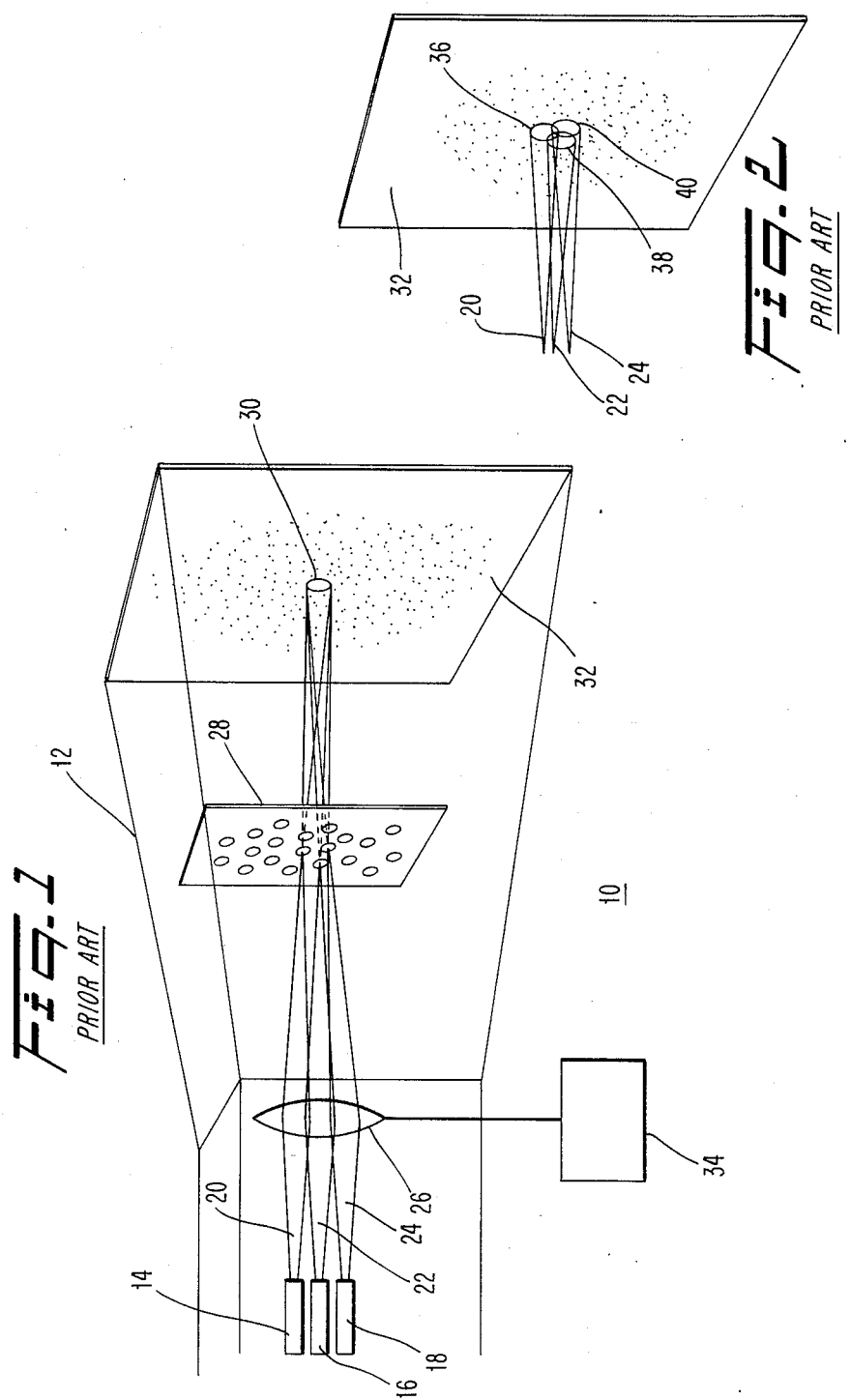

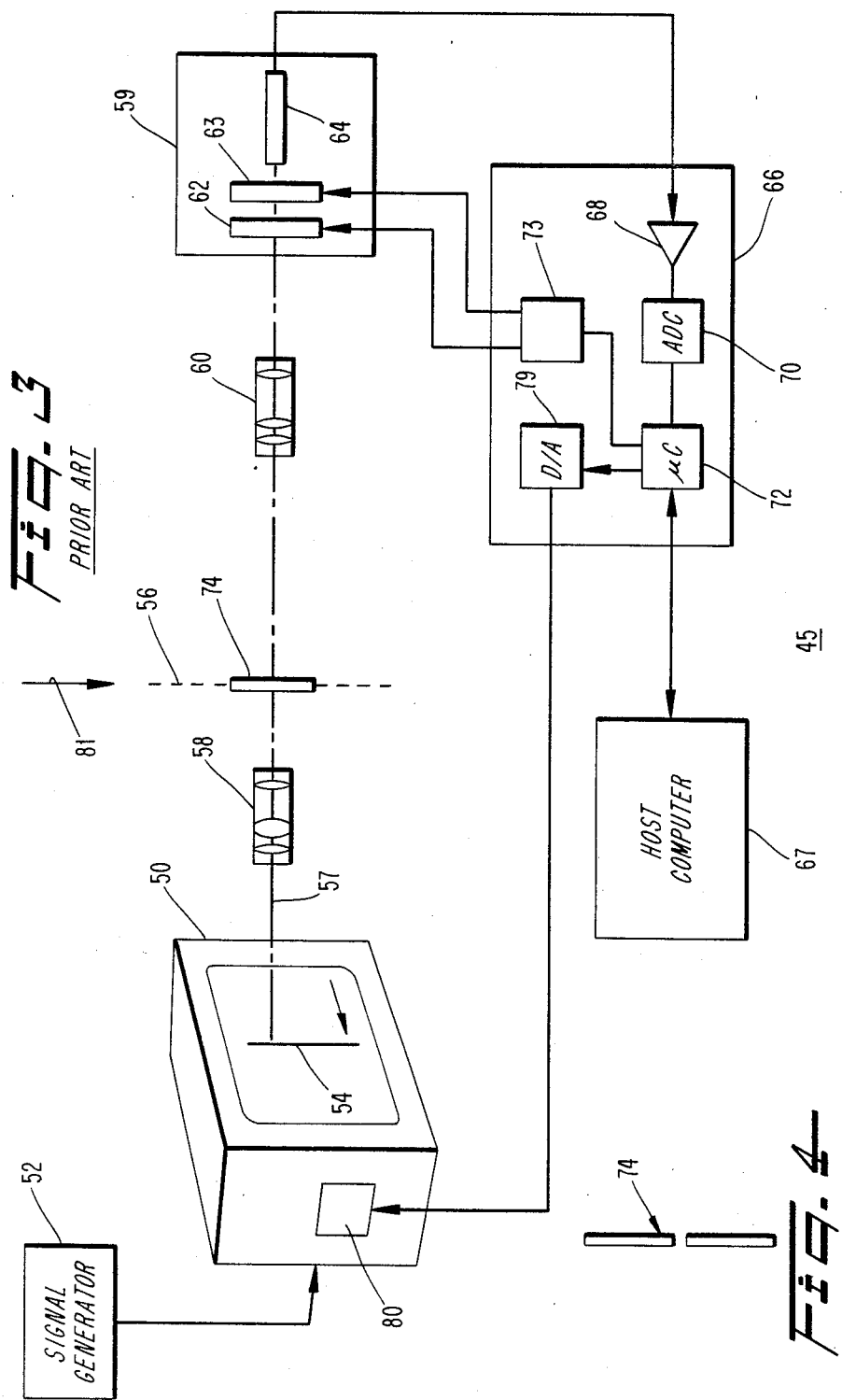

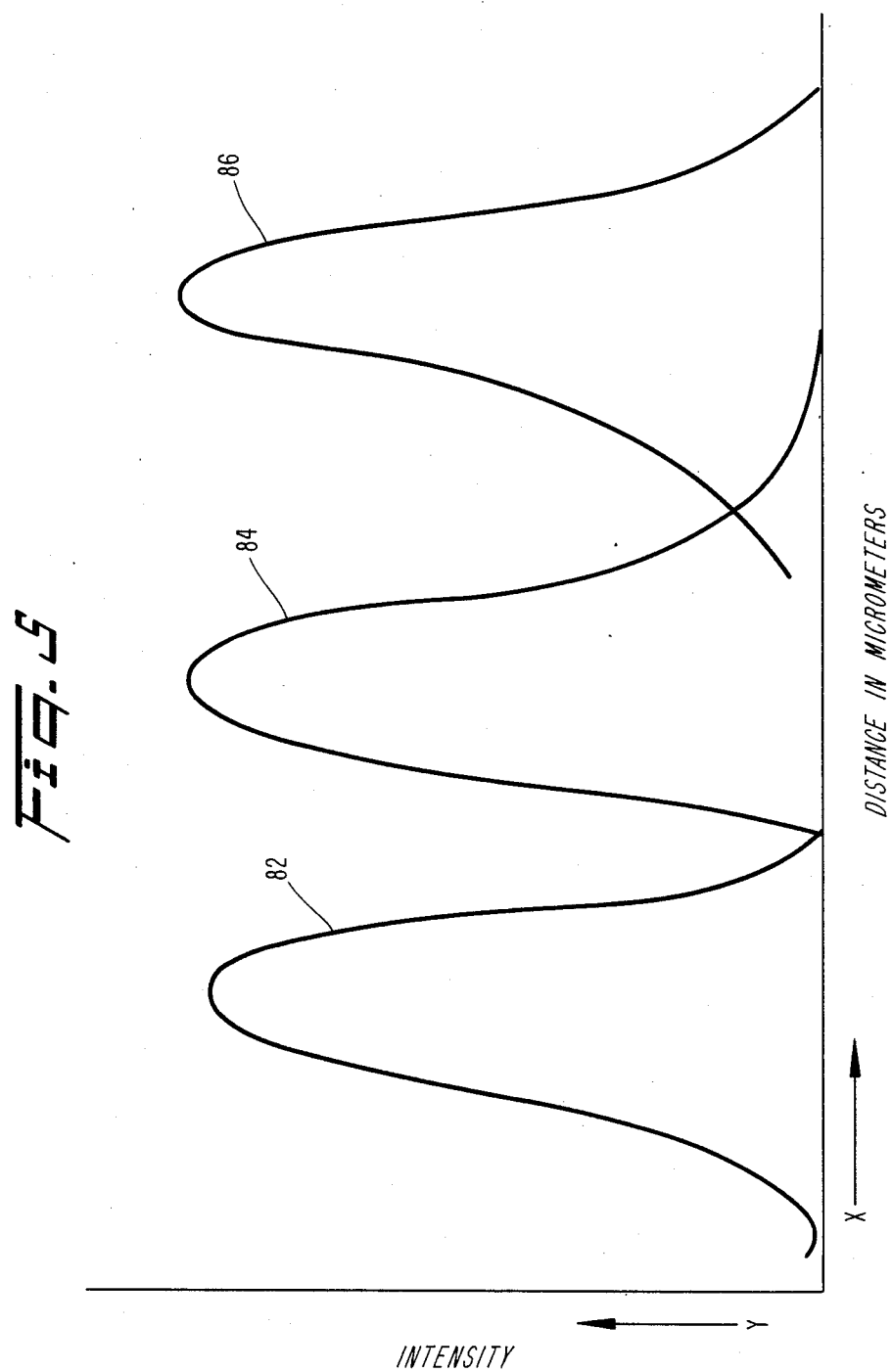

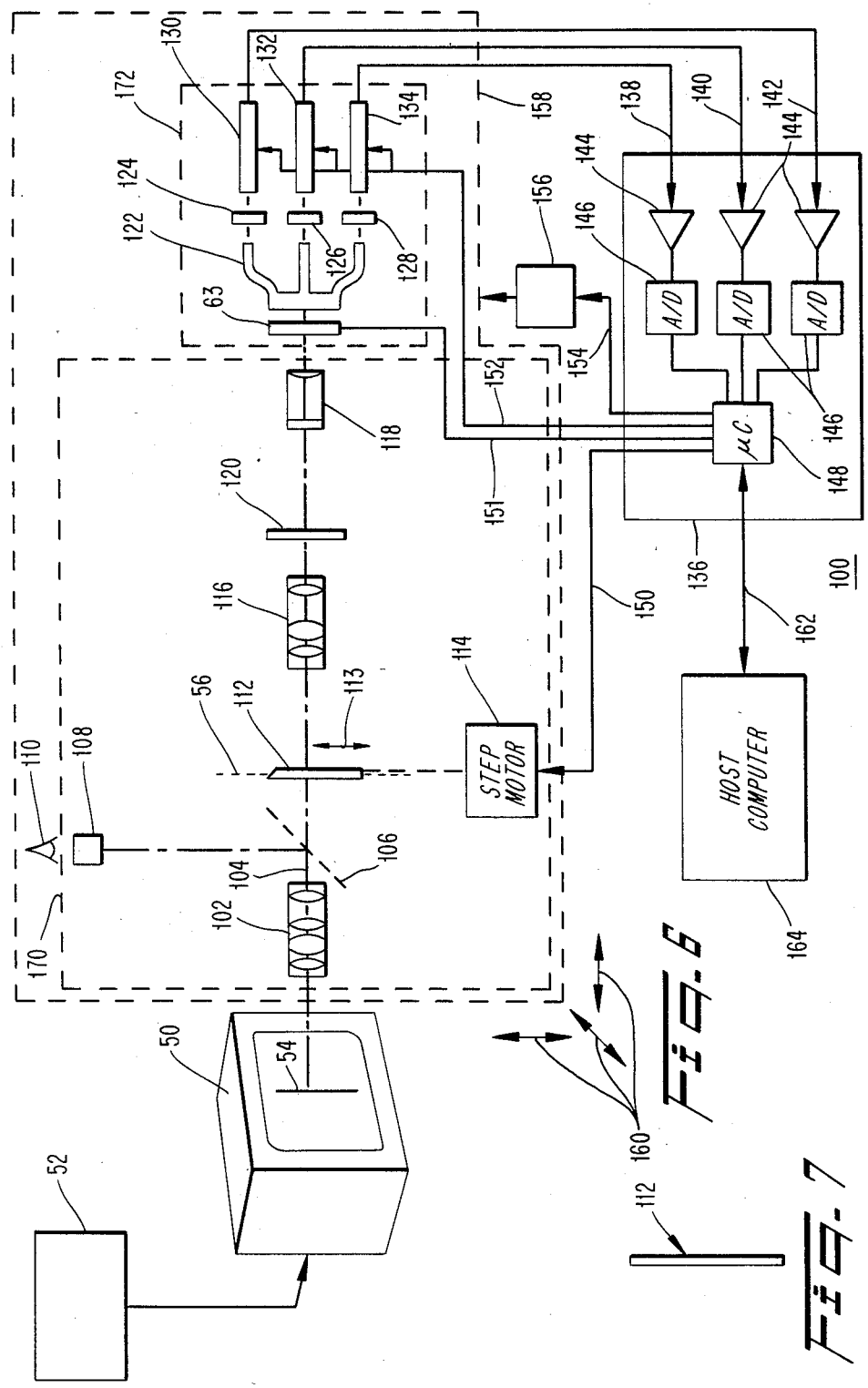

| CENTROID POSITION | BLUE −0.010 | GREEN −0.028 | RED −0.031 |

| CENTROID POSITION | BLUE −0.010 | GREEN −0.027 | RED −0.031 |

| CENTROID POSITION | BLUE 0.004 | GREEN −0.031 | RED −0.049 |

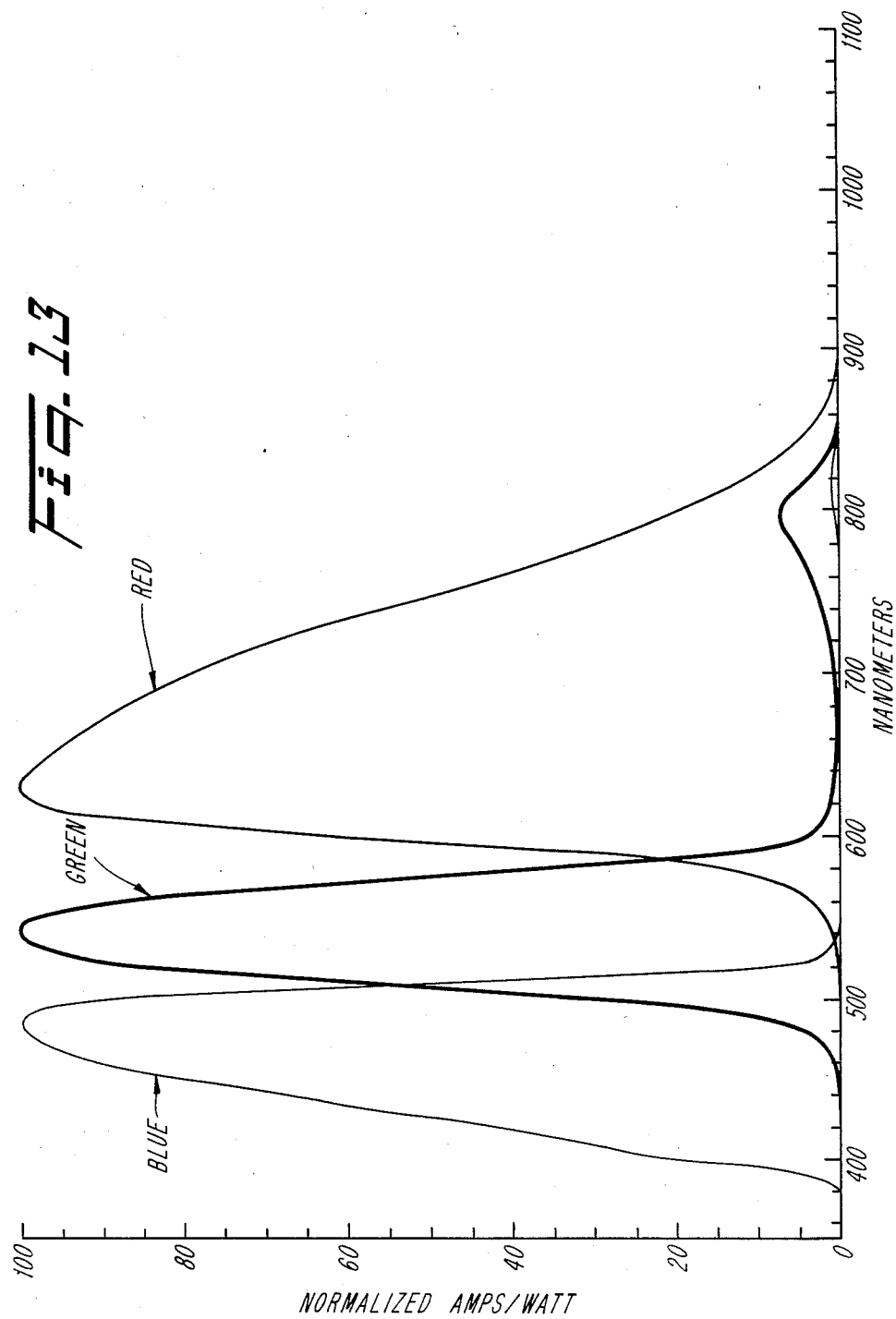

METHOD AND APPARATUS FOR MEASURING SPATIAL PROFILES OF ENERGY BEAMS

BACKGROUND OF THE INVENTION

The invention relates generally to measurement apparatus and methods and, more particularly, to apparatus and methods for performing spatial measurements of energy beams.

With increasing use of information display devices such as color cathode ray tubes (CRTs) in information processing, computer aided design/computer aided manufacturing (CAD/CAM), and graphic display applications including air traffic control, as well as in the traditional field of home entertainment, demand is growing for efficient high-accuracy optical measurement systems and techniques to aid in manufacturing and servicing of information display devices. It is particularly desired to provide a more efficient technique for accurately measuring the convergence of a color CRT.

Color CRTs typically employ three beams of electrons conveying intensity information for red, green, and blue portions of a color CRT display. The beams are focused on tiny triads of phosphor elements, with each separate element of the triad being a separate type of phosphor element respectively emitting red, green, and blue light when activated by incident electron beams conveying respective red, green, and blue intensity information. The triads may be arranged in patterns such as tiny triangles of round phosphor elements or groups of longitudinally adjacent stripes. Many CRTs employ a structure such as a shadow mask or grille to ensure that the red beam will only strike the red phosphor elements, the green beam will only strike the green phosphor elements, and the blue beam will only strike the blue phosphor elements.

Such structure is shown in FIG. 1, which is a schematic representation of a portion of a color CRT 10. CRT 10 includes an evacuated glass envelope 12 including electron guns 14, 16, and 18 which respectively generate beams 20, 22, and 24 of electrons, the intensity of which represents the intensity of respective red, green, and blue information to be displayed on the CRT. This intensity data is supplied to guns 14, 16, and 18 by associated circuitry (not shown). In other types of CRTs, beams 20, 22, and 24 may be generated by a single gun.

Beams 20, 22, and 24 are directed by deflection apparatus represented schematically at 26 through a shadow mask 28 to patterns of phosphor elements 30 adhered to the inside of the face 32 of CRT 10. Adjustment circuitry 34 is provided to adjust deflection apparatus 26 to ensure that beams 20, 22, and 26 converge to the same area on tube face 32, as shown in FIG. 1. If adjustment is not properly performed, the beams will not activate the same triads of phosphor elements 30, resulting in color fringeing of the image displayed in CRT 10. This misconvergence is shown schematically in FIG. 2, wherein beams 20, 22, and 24 respectively are incident upon areas 36, 38, and 40 of tube face 32 which do not coincide.

A schematic diagram of prior art apparatus for measuring the convergence adjustment of a CRT is shown in FIG. 3. A monitor 50 containing a CRT to be tested is supplied with a signal from a generator 52 to produce a pattern, such as vertical white line 54. Light from line 54 travels over an optical path 57 such that an image of white line 54 is generated by optical apparatus 58 at an image scanning plane 56. The image is transmitted by an optical system 60 to a detector apparatus 59. Detector apparatus 59 includes variable filter 62, a shutter 63, and a detector device such as a photomultiplier tube (PMT) 64 which provides an output signal representative of the intensity of radiation incident upon a target surface within the detector device. PMT 64 of detector apparatus 59 is connected to a control apparatus 66, which includes an amplifier 68, the output of which is supplied through an analog-to-digital converter (ADC) 70 to a microcomputer 72. Control apparatus 66 is connected to a host computer 67.

A slit aperture 74 is positioned in optical path 57 at image scanning plane 56. FIG. 4 shows a top view of aperture 74, viewed in the direction of arrow 81 of FIG. 1.

Microcomputer 72 is connected to an output controller 73 which operates shutter 63 to assist in drift compensation. Microcomputer 72 also connected through controller 73 to variable filter 62 to permit control of the spectral transmission characteristics of filter 62. Microcomputer 72 is also connected through a digital-to-analog converter 79 to deflection circuitry 80 of monitor 50 to permit control of white line 54 generated by monitor 50.

To perform a convergence measurement using the prior art apparatus of FIG. 3, a signal was transmitted from microcomputer 72 to deflection circuitry 80 to cause line 54 to scan horizontally across the face of monitor 50 in small increments of, for example, 1/10 of the width of line 54. Light from excited red, green, and blue phosphor elements thus passed through slit aperture 74 to PMT 64, with filter 62 initially adjusted for a wave length of, for example, 630 nanometers, to pass light emitted by the red phosphor. Scanning of line 54 across the face of monitor 50 allowed PMT 64 to generate an intensity versus displacement profile of the electron beam that excited the red phosphors of monitor 50.

Microprocessor 72 then supplied signals to deflection circuitry 80 to cause line 54 to return to its original position. Filter 62 was then adjusted to a setting of, for example, 540 nanometers, to pass light emitted by the green phosphor. Signals were then supplied to deflection circuitry 80 to cause line 54 to be scanned in 1/10 beam width increments across the face of monitor 50, thus generating an intensity versus displacement profile of the electron beam that excited the green phosphor. Filter 62 was then adjusted to a frequency of, for example, 450 nanometers, to pass light emitted by the blue phosphor and line 54 was similarly scanned to provide an intensity versus displacement profile of the electron beam which excited the blue phosphor. The output from apparatus 66 to host computer 67 thus consisted of horizontal intensity profiles for each of the three electron beams. Software in host computer 67 then computed both the X coordinate of the centroid, that is, the center of energy, for each beam, as well as the spatial relationship in millimeters between the centroids of each of the three beams. These intensity profiles were free of variations of data caused by the shadow mask structure, since aperture 74 was not scanned relative to the phosphor/shadow mask structure. The profiles thus generated also included any interaction among the three beams, since all three beams were activated during measurement. It is generally accepted that the intensity profile of an electron beam incident upon a phosphor coated surface can theoretically be described by a Gaussian function. The resultant intensity profiles obtained by the method of FIG. 3 accordingly exhibited approximately Gaussian distribution.

The above described method of scanning electron beams past aperture 74 gives good electron intensity profile data which is relatively free from undesired effects caused by phosphor graininess or noise, thus facilitating the centroid determination. It is therefore satisfactory in many applications. However, it is not always possible to provide a connection between control apparatus 66 and the internal circuitry 80 of the monitor under test. An alternative method is to scan aperture 74 relative to a stationary image of line 54. However, such method using prior art apparatus produced intensity variations caused by the shadow mask structure. Determination of a true intensity profile from such data, and hence the centroid location, is extremely difficult and susceptible to error. An additional problem of the above described method is the difficulty in accumulating data representing 100% of the image energy, a problem caused by overlapping or non-continuous slit measurements and by the interaction between slit width and aperture position.

In order to obtain highest accuracy, it was therefore necessary to compensate for the effect of the measuring slit width, due to interactions between slit width, line width, and line deflection increments. An example of a spatial profile obtained in this manner is shown in FIG. 5. The X axis of FIG. 5 represents horizontal distance across the width of vertical line 54, and the Y axis represents intensity. FIG. 5 includes three curves 82, 84, and 86 respectively representing the spatial intensity profiles of red, green, and blue components of white line 54.

The centroid of each beam was calculated by summing the intensity values for all line deflection increments to determine the total area under the measured intensity profile curve. That is, for each position in the X direction, there was a corresponding measured intensity value. For each position in the X direction, a summation value was calculated equal to the sum of the intensity values for all preceding positions. These summation values were stored in the host computer as a function of the X position and the fifty percent value calculated. The X positions of summation values on either side of the fifty percent value were determined, and the X position of the fifty percent value calculated by interpolation. This interpolated X position of the fifty percent summation value was the centroid of the beam.

However, errors were introduced into the centroid calculation due to noise present on curves 82, 84, and 86, the effects of which are extremely difficult to compensate for. Another difficulty in obtaining convergence measurements is the effect of CRT line jitter on data obtained through slit aperture 74.

SUMMARY OF THE INVENTION

It is therefore an object of the present invention to provide a method and apparatus for measuring spatial profiles of energy beams which exhibits improved signal-to-noise ratio.

It is another object of the present invention to provide a method and apparatus for measuring spatial profiles of energy beams which eliminates the effects of slit width on spatial profiles.

It is yet another object of the present invention to provide a method and apparatus for measuring spatial profiles of energy beams which exhibits a more accurate profile centroid calculation.

It is a further object of the present invention to provide a method and apparatus for measuring spatial profiles of energy beams which minimizes the effect of jitter on convergence and color measurements.

It is yet a further object of the present invention to provide a method and apparatus for measuring spatial profiles of energy beams which minimizes problems caused by the relationship of measurement aperture and shadow mask structure.

It is also an object of the present invention to provide a method for measuring convergence in a color CRT which does not require access to the deflection circuits of the CRT under test, which has high accuracy, and which can be rapidly and efficiently performed in a production environment.

Additional objects and advantages of the invention will be set forth in part in the description which follows and in part will be obvious from the description, or may be learned by practice of the invention. The objects and advantages of the invention may be realized and attained by means of the instrumentalities and the combinations particularly pointed out in the claims.

To achieve the objects, and in accordance with the purpose of the invention, as embodied and broadly described herein, the apparatus of this invention comprises means for generating a radiant energy image representative of the energy intensity of a cross section of a beam to be measured, detector means for measuring the intensity of the radiant energy of the image, means for supplying the radiant energy of the image along an optical path to the detector means, a knife edge aperture positioned in the optical path between the generating means and the detector means, means for transversely moving the knife edge aperture across the optical path, and processor means connected to the detector means and the moving means for obtaining the integral of the detector means output with respect to the position of the knife edge aperture and for generating an output representative of the spatial characteristics of the beams from the integral. In a preferred embodiment, the processor means includes means for curve fitting the integral to a predetermined mathematical function, such as a Gaussian function, to permit comparision of the measured data with the mathematical function.

In another aspect, the invention comprises a method for measuring spatial characteristics of a pattern of radiation from multiple phosphor element types activated by multiple electron beams in a cathode ray tube, comprising the steps of forming an image of the pattern, supplying energy from the image over an optical path to a detector, placing a knife edge aperture in the optical path to prevent energy of the image from reaching the detector, transversely moving the knife edge aperture to permit increasingly greater portions of energy from the image to reach the detector, integrating the energy received by the detector as the knife edge aperture is moved to obtain an integral of the energy with respect to position across the pattern, and generating an output signal representative of the spatial characteristics of the pattern from the integral.

The accompanying drawings, which are incorporated in and constitute part of the specification, illustrate an embodiment of the invention, and together with the description, serve to explain the principles of the invention.

BRIEF DESCRIPTION OF THE DRAWINGS

FIG. 1 is a schematic diagram illustrating the process of convergence of a cathode ray tube;

FIG. 2 is a detailed view of the face of the cathode ray tube shown in FIG. 1, illustrating improper beam convergence;

FIG. 3 is a block diagram of prior art convergence measurement apparatus;

FIG. 4 is a top view of the slit aperture shown in FIG. 3;

FIG. 5 is a graph showing the spatial profiles of red, green, and blue electron beams in the cathode ray tube of FIG. 1;

FIG. 6 is a block diagram of a preferred embodiment of the present invention;

FIG. 7 is a top view of the knife edge aperture of the apparatus shown in FIG. 6;

FIG. 13 is a graph showing the spectral response of filters of the embodiment shown in FIG. 6.

DESCRIPTION OF THE PREFERRED EMBODIMENT

Figure 8:
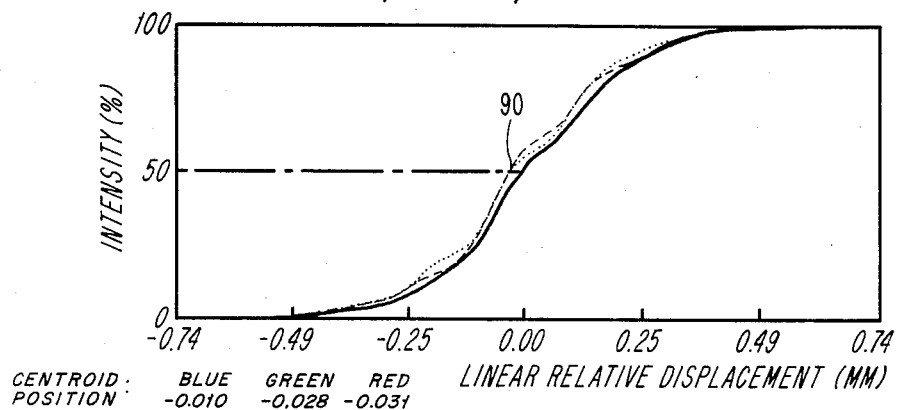
FIG. 8 is a graph of the integral of beam energy with respect to position, of a properly converged CRT, as obtained by the apparatus of FIG. 6.

Reference will now be made in detail to the present preferred embodiments of the invention, an example of which is illustrated in the accompanying drawings. Throughout the drawings, corresponding reference characters refer to like elements.

FIG. 6 shows a convergence measuring system 100 which constitutes a preferred embodiment of the present invention. As can be seen in FIG. 6, a signal generator 52 supplies a signal to a monitor 50 producing a white line 54 of the monitor screen, as in the prior art system shown in FIG. 3. However, the white line 54 is stationery upon the screen of the CRT of monitor 50. The CRT of monitor 50 thus constitutes means for generating a radiant energy image representative of the energy intensity of a cross section of an electron beam to be measured.

Light from line 54 is supplied through an optical objective imaging system shown schematically at 102. System 102 supplies light over an optical path 104 to a viewing mirror 106. Mirror 106 supplies a portion of light from line 54 to a viewing assembly 108 which provides an image of line 54 to the eye 110 of an observer.

The majority of light over optical path 104 passes through mirror 106 to form an image of line 54 at image scanning plane 56. Positioned in image scanning plane 56 is a knife edge aperture 112 transversely movable in the direction indicated by arrow 113 with respect to optical path 104 under control of a stepper motor 114. In a manner to be more completely described below, knife edge aperture 112 is operable to permit incrementally increasing portions of light to pass over optical path 104. With knife edge aperture 112 withdrawn from optical path 104, light passes through a field lens reimaging system consisting of a first portion 116 and a second portion 118 disposed along optical path 104 on either side of a diffuser 120. From portion 118, light then passes through a shutter 63 to an image splitting device 122 which splits the light from path 104 into three identical portions and passes each portion respectively through filters 124, 126, and 128 to detector devices 130, 132, and 134. Detectors 130-134 generate an electrical signal proportional to the intensity of light radiation which is incident upon an internal target of the detector device. In the preferred embodiment, detector devices 130-134 constitute photomultiplier tubes (PMTs).

Diffuser 120 consists of a piece of frosted acrylic plastic and is useful in achieving desired uniformity of output from detector devices 130-134, as a function of aperture position. The specific material for diffuser 120 and its exact position on optical path 104 are chosen experimentally by scanning a uniform standard white light source with a slit aperture and observing the output of detector devices 130-134. The degree of diffusion of diffuser 120 and its position are selected so as to provide the most uniform output of detector devices as the slit aperture is scanned across optical path 104. In the preferred embodiment, type 2447 acrylic plastic commercially available from Rohm & Haas, Inc. of Philadelphia, Pa. was used for diffuser 120 and was positioned in the filter compartment of an EG&G Gamma Scientific Type GS-2110A telemicroscope. In some applications, diffuser 120 may not be necessary.

Field lens reimaging system 116,118 takes an image of the exit pupil from optical objective imaging system 102 and projects it upon targets of detector devices 130-134. Image splitting device 122 consists of a fiber optics system which splits the light radiation arriving over optical path 104 into three identical portions. Various other systems may be used to provide the function of image splitting, such as a plurality of prisms or half-silvered mirrors. Similarly, detector devices 130-134 need not constitute photomultiplier tubes, but may comprise other types of devices such as solid state detector arrays composed of silicon or germanium photodiodes.

Filters 124 provide selective transmission of light, with each filter transmitting a separate relatively narrow band of frequencies. In order to obtain proper data from system 100, it is not necessary that filters 124-128 have any specific spectral characteristics. The spectral characteristics of the phosphors of monitor 50, filters 124-128, and detector devices 130-134 are accommodated by calibration and correction procedures to be described in greater detail. In a preferred embodiment, filters 124-128 are composed of dichroic coated optical glasses and absorption type filter glasses, providing transmission wavelength bands respectively centered at approximately 415 nanometers, 540 nanometers, and 620 nanometers, as shown in FIG. 13.

The electrical output from detector devices 130-134 is supplied to a control apparatus 136 over conductors 138, 140, and 142. Signals from conductors 138-142 are respectively supplied through separate amplifiers 144 and ADCs 146 to a microcomputer 148. Microcomputer 148 includes outputs 150, 151, 152, and 154 which respectively connect microcomputer 148 to stepper motor 114, shutter 63, the high voltage supplies of detector devices 130-134, and an X-Y-Z translation control device 156. Control device 156 is operatively connected to a frame structure 158 which rigidly supports the components of FIG. 6 shown as contained within structure 158. Upon receipt of appropriate control signals from microcomputer 148, translation device 156 is operative to precisely move frame structure 158 and associated components in X, Y, and Z directions, as shown by arrows 160 to effectively analyze any desired portion of the face of a cathode ray tube contained in monitor 50.

Microcomputer 148 is also connected over a communications channel, or link, 162 to a host computer 164. Host computer 164 includes an operator interface to enable an operator to specify measurement parameters and transmit commands over communications channel 162 to control apparatus 136. Host computer 164 is also operative to receive data from control apparatus 136, manipulate such data, and display it in a manner meaningful to an operator. Host computer may be any general purpose personal computer, such as an IBM PC 5150 personal computer.

Prior to performing a convergence measurement, a three-color Y-axis (intensity) vs. X-axis (aperture displacement) spatial calibration is performed on the apparatus shown in FIG. 6 to correct for "cosine forth" fall-off in light intensity in the image plane. Monitor 50 is temporarily replaced by a uniform standard source of white light of known spectral characteristics. A slit aperture is scanned across optical path 104 and output signals from detectors 130–134 processed to obtain spatial correction factors for subsequent measurements.

Next X-axis calibration is performed in which a Ronchi target (a high precision grid of opaque lines formed on a transparent substrate, tracible to the National Bureau of Standards) is back-illuminated with the uniform standard white light source. A slit aperture is positioned across optical path 104 in image plane 56 so as to completely block all light from reaching detectors 130–134. The slit aperture is then transversely moved across optical path 104 through small increments of known distance and the resultant signals from detectors 130–134 analyzed. Since the distance between opaque grid lines of the Ronchi target and the increments of movement of slit aperture are accurately known, the spatial relationship between distance in the image plane and the distance in the object plane (i.e., the plane of the Ronchi target) can be determined and stored. This relationship can also be described as the magnification of system 102.

If the spectral characteristics of either the phosphors, the filters 124–128, or detector devices 130–134 overlap, errors can be generated in data intended to be representative of the spatial characteristics of the beams being measured. For example, assume that only the blue beam in a CRT is activated, and the green and red beams are extinguished. Although only the detector device sensitive to blue light would be expected to generate an output, spectral overlap of components in the system (phosphors, filters, or detector devices) will generally cause a finite output to be generated by all three detector devices, even when only the blue beam is activated. For example, the so-called blue phosphor, when activated by an electron beam, may generate light which is perceived as a light blue. However, a spectral analysis of the phosphors would indicate that the light from the "blue" phosphor actually includes as much light in the red wavelengths as the "red" phosphor. That is, the outputs from the three detectors each include components contributed by all phosphors. This phenomenon can be expressed as follows:

$$YB = YB_B + YB_G + YB_R - 2*DB \quad (Eq.1)$$

$$YG = YG_B + YG_G + YG_R - 2*DG \quad (Eq.2)$$

$$YR = YR_B + YR_G + YR_R - 2*DR \quad (Eq.3)$$

where:

YB = output signal of the blue detector with all beams activated;

YG = output signal of the green detector with all beams activated;

YR = output signal of the red detector with all beams activated;

$YB_B$, $YB_G$, and $YB_R$ = component of the blue detector output signal contributed by the blue, green, and red phosphors, respectively;

$YG_B$, $YG_G$, and $YG_R$ = components of the green detector output signal contributed by the blue, green, and red phosphors, respectively;

$YR_B$, $YR_G$, and $YR_R$ = components of the red detector output signal contributed by the blue, green, and red phosphors, respectively;

DB, DG, and DR = output signals of the blue, green, and red detectors, respectively, with no light incident thereon (i.e. the "dark current"). A spectral calibration procedure is therefore performed to eliminate the posibility of errors by eliminating from each detector output signal the contributions generated by phosphors of the "other" colors. To initiate the spectral calibration procedure, an image of a white CRT line is applied to detector devices 130–134 with knife edge aperture 112 in mid position across optical path 104, and the high voltage signals supplied to each detector device are adjusted by mccrocomputer 148 such that output signals YB, YG, and YR respectively generated by blue, green, and red detector devices 130, 132, and 134 are approximately equal. All beams are then turned off and dark current signals DB, DG, and DR are read.

The blue beam of the CRT is turned on and the maximum detector output signals $Y_CB_B$, $Y_CG_B$, and $Y_CG_B$ are read, respectively representing the maximum output of the blue detector contributed by the blue phosphor, the output of the green detector contributed by the blue phosphor, and the output of the red detector contributed by the blue phosphor, with only the blue beam activated.

The blue beam is turned off and the green beam is turned on. Detector output signals $Y_CB_G$, $Y_CG_G$, and $Y_CR_G$ are read, respectively representing the output of the blue detector contributed by the green phosphor, the output of the green detector contributed by the green phosphor, and the output of the red detector contributed by the green phosphor, with only the green beam activated.

In a similar manner, the green beam is turned off and the red beam is turned on. Detector output signals $Y_CB_R$, $Y_CG_R$, and $Y_CR_R$ are read, respectively representing the output of the blue detector contributed by the red phosphor, the output of the green detector contributed by the red phosphor, and the output of the red detector contributed by the red phosphor, with only the red beam activated. The following coefficients are then calculated and stored:

$$K_{GB} = Y_CG_B / Y_CB_B$$

$K_{RB} = Y_C R_B / Y_C B_B$ $K_{BG} = Y_C B_G / Y_C G_G$ $K_{RG} = Y_C R_G / Y_C G_G$ $K_{BR} = Y_C B_R / Y_C R_R$ $K_{GR} = Y_C G_R / Y_C R_R$

By matrix algebra, $YB_B$, $YG_G$, and $YR_R$, respectively representing the blue detector output signal contributed by the blue phosphor, the green detector output signal contributed by the green phosphor, and the red detector output signal contributed by the red phosphor, with all beams activated, can be expressed as functions of measured values and coefficients calculated during the calibration procedure as follows:

$$YB_B = \frac{(K_{GR}K_{RG} - 1)YB + (K_{BG} - K_{BR}K_{RG})YG + (K_{BR} - K_{BG}K_{GR})YR}{K_{BG}K_{GB} + K_{BR}K_{RB} + K_{GR}K_{RG} - K_{BR}K_{GB}K_{RG} - K_{BG}K_{GR}K_{RB} - 1} \quad \text{(Eq. 4)}$$

$$YG_G = \frac{(K_{GB} - K_{GR}K_{RB})YB + (K_{BR}K_{RB} - 1)YG + (K_{GR} - K_{GB}K_{BR})YR}{K_{BR}K_{RB} + K_{GR}K_{RG} - K_{BR}K_{GB}K_{RG} - K_{BG}K_{GR}K_{RB} + K_{BG}K_{GB} - 1} \quad \text{(Eq. 5)}$$

$$YR_R = \frac{(K_{RB} - K_{GB}K_{RG})YB + (K_{RG} - K_{BG}K_{RB})YG + (K_{BG}K_{GB} - 1)YR}{K_{BR}K_{RB} + K_{GR}K_{RG} - K_{BR}K_{GB}K_{RG} - K_{BG}K_{GR}K_{RB} + K_{BG}K_{GB} - 1} \quad \text{(Eq. 6)}$$

To begin a convergence measurement, the Ronchi target is replaced by monitor 50, the slit aperture is removed, knife edge 112 is inserted, and objective imaging system 102 is adjusted to exactly place line 54 in the object plane of system 100. Knife edge aperture 112 is then positioned across optical path 104 so as to completely block all light from reaching detectors 130–134. Signals from detectors 130–134 are amplified and converted to digital quantities and read by microcomputer 148 to provide an initial data point. The data points for each of the detectors 130–134 are then stored by microcomputer 148 in first locations of respective data files. Microcomputer 148 then commands stepper motor 114 to transversely move knife edge aperture 112 a precise increment of distance, for example, ten micrometers, across optical path 104 in a direction tending to expose a portion of light along optical path 104 to detectors 130–134. A second reading is then taken of the output signals from detectors 130–134 and stored at subsequent loctions in the data files. In a similar manner, microcomputer 148 commands stepper motor 114 to continue to move knife edge aperture 112 in identical ten micrometer increments in a transverse direction across optical path 104. After each increment, readings are taken from detectors 130–134 and stored in subsequent locations in the data files. This process is continued until all light from an image of line 54 reaches detector 130–134. This point is determined by microcomputer 148 when the difference between successive readings of detectors 130–134 is less than a predetermined limit value.

After completion of the scan of knife edge aperture 112 described above, the data files of microcomputer 148 contain data which represents the integrals of intensities of light $YB_2$, $YG_2$, and $YR_2$ from line 54 as a function of spatial distance across line 54, for each of three frequency bands determined by filters 124–128. This data is then processed mathematically to obtain integrals of intensity values $YB_B$, $YG_G$, and $YR_R$ representative of energy intensities for each energy beam. Such processing consists of solution of Equation 4, 5, and 6.

The sets of processed data are normalized, that is, mathematically processed so that their 0% and 100% points coincide on the Y-axis, and displayed in the form of a graph as shown in FIG. 8. If desired, the integral obtained from a scan of knife edge aperture 112 across optical path 104 may be curve fitted to a predetermined mathematical function representative of the spatial intensity characteristics of the energy beam being measured. For example, many such beams can be described as a Gaussian function. It is often desired to make the assumption that the image produced on a CRT will be perceived as a Gaussian function. In such cases it is desirable to model, or curve fit, the measured data to a Gaussian function. In the preferred embodiment of the present invention, this procedure is performed as follows:

Any Gaussian curve which is asymptotic to the x-axis in the X-Y plane can be described by the analytical function:

$$Y = Ae^{[-\frac{(x-b)^2}{k^2}]} \quad \text{(Eq. 7)}$$

where

A = max amplitude b = x-axis offset of centroid k = width of Gaussian

The centroid location (b) of the Gaussian curve may be computed in the same manner as previously described with relation to the prior art, directly using a knife-edge aperture rather than a slit aperture. Width k of the Gaussian curve is computed from the relation:

$$k = \frac{1}{2}\left[\frac{(x_2 - b)^2 + (x_1 - b)^2}{-\text{Ln}(\frac{1}{2})}\right] \quad \text{(Eq. 8)}$$

where b = X-axis offset of centroid $x_1$ = 12% Intensity Location on knife-edge curve.

$x_2$ = 88% Intensity Location on knife-edge curve.

It should be noted the x-axis location of the 12% intensity point on a Gaussian Integral Function is coincident with the left 50% intensity point on the underlying Gaussian function (the line profile). Also, the x-axis location of the 88% point on a Gaussian Integral Function is coincident with the right 50% intensity point on the underlying Gaussian function (the line profile).

The maximum amplitude (A) of the underlying Gaussian Function may be computed from the relation:

$$A = \frac{P}{\sqrt{\pi k}} \quad \text{(Eq. 9)}$$

where

P = peak intensity of knife-edge scan data k = Gaussian "Width" k = from Eq. 8

$\pi$ = 3.1415927

These values (b, k, A) are used in Eq. 7 to generate the Gaussian model of the line profile.

Figure 10:
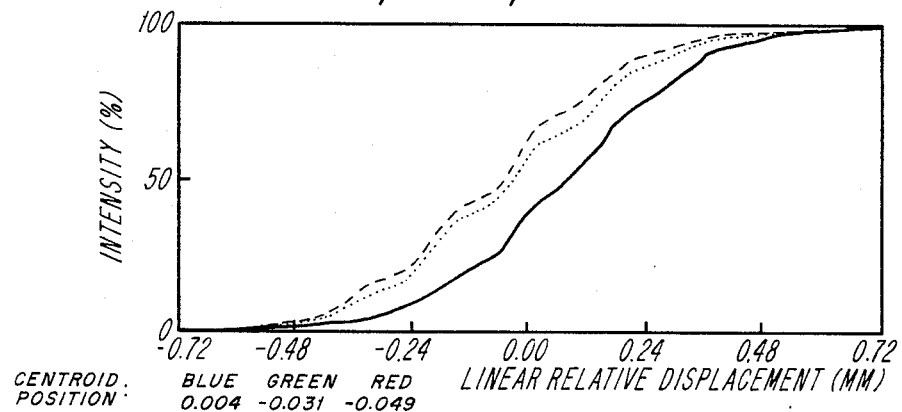
FIG. 10 is a graph of the integrals of energy intensity with respect to spatial position, of a misconverged CRT, as obtained by the apparatus of FIG. 6.

The X-axis positions where each curve of FIG. 8 crosses the Y-axis 50% point are determined. These X-axis positions, shown at 90 in FIG. 8, represent the centroids of the energy distributions of the three colors contained in line 54. A difference between the X coordinates of the centroids of each of the three colors is directly proportional to the degree of misconvergence of the three beams of the CRT of monitor 50. That is, perfect convergence of these beams would result in the centroid of each beam having an identical X coordinate. Integral data from a misconverged CRT is shown in FIG. 10. It can be seen that the fifty percent points on the Y axis for the three colors occur at significantly different X coordinants.

Figure 9:
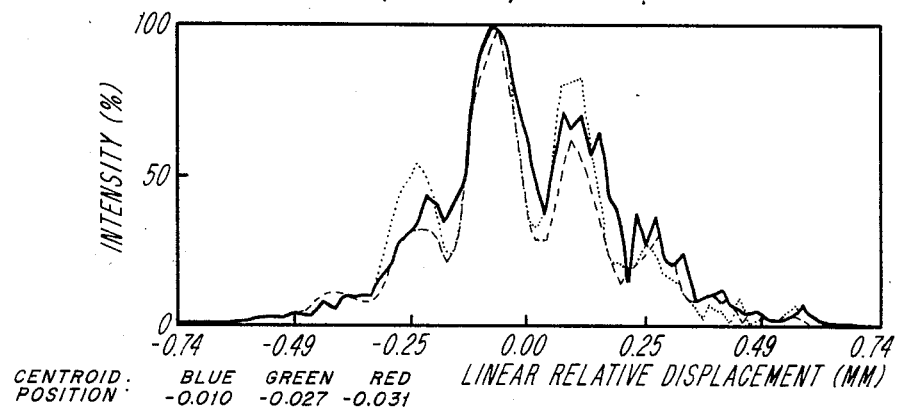
FIG. 9 is a graph of a spatial profile derived from the integrals of FIG. 6.

A spatial line profile, that is, the intensity of the image of line 54 at given X coordinates, is then obtained by differentiating the integral value shown in FIG. 8. This yields a graph as shown in FIG. 9.

It can be seen from the figures and the preceding description that the invention includes detector means for measuring the intensity of the radiant energy of an image representative of the energy intensity of a cross section of a energy beam to be measured. In the preferred embodiment, the detector means comprises photomultiplier tubes 130–134. The invention further includes means for supplying radiant energy of the image along an optical path to the detector means. As embodied herein, the supplying means comprises objective imaging system 102, field lens reimaging system 116,118, diffuser 120, and image splitting device 122.

The invention further includes means for transversely moving the knife edge aperture across the optical path. As embodied herein, the moving means comprises stepper motor 114 under control of microcomputer 148.

The invention further includes processor means connected to the detector means and the moving means for obtaining the integral of the detector means output with respect to the position of the knife edge aperture and for generating an output representative of the spatial characteristics of the beams from the integral. As embodied herein, the processing means comprises microcomputer 148 and host computer 164.

In the preferred embodiment, objective imaging system 102, viewing mirror 106, viewing assembly 108, knife edge aperture 112, stepper motor 114, field lens reimaging system 116, 118, and diffuser 120, are contained in an integral telemicroscope unit 170. A suitable telemicroscope is type GS2110A commercially available from EG&G Gamma Scientific, Inc. In the preferred embodiment, shutter 63, image splitting device 122, filter 124, and detectors 130–134 are packaged as a detector unit 172 such as a model GS4555 tri-PMT, and control apparatus 136 comprises an intelligent radiometer, such as a type GS-4100-013, both of which are also commercially available from EG&G Gamma Scientific, Inc.

The use of a knife edge aperture provides significant advantages over prior art techniques employing a slit aperture. For example, the amount of light reaching detectors 130–134 at each stage of the image scan is significantly greater for the knife edge aperture than for a slit aperture, thus providing a considerable improvement in signal-to-noise ratio for many data points. Moreover, the effects of slit width on spatial profiles are eliminated. A more accurate centroid calculation may be obtained since such determination can be made by simply determining the X coordinant of the 50% point of the integral. Moreover, the deleterious effects of line jitter, present during slit aperture scans, can be eliminated. The use of the knife edge also minimizes probless of inaccuracies caused by interactions of the slit aperture width with the structural characteristics of the shadow mask. Finally, increased accuracy is obtained since the apparatus insures that 100% of the energy of the image is processed by the detectors.

The logic flow of instructions contained in microcomputer 148 will now be described with reference to FIG. 11. At block 200 the power-on/reset self test and initialization routines are performed, in which memory, communication channel, and cyclic redundancy checks are performed in microcomputer 148 and the stepper motor 114 is reset to its starting position. Communication channel 162 is then continuously checked.

At block 202 microcomputer 148 acknowledges the establishment of communications with host computer 164 and receives the system variables as specified by host computer 164. In block 204, microcomputer 148 continuously checks the communications channel, waiting for a command from the, host computer and, at block 206, receives a command from host computer 164.

At block 208, microcomputer 148 checks the stepper motor position for errors. At block 210, the detector output for the blue, green and red channels is sampled via the amplifiers 144 and analog-to-digital converters 146.

At block 212, microcomputer 148 checks the detector outputs for errors. If no errors are detected, the samples are stored as digital numbers. At block 214, blocks 210 and 212 are repeated the number of times that was specified by the host computer and control apparatus 136 computes the mean values of the samples of the blue, green and red detectors 130–134. At block 216, control apparatus 139 communicates the mean values to the host computer. If an error was detected at block 212, an error code is reported. At block 218 the microcomputer 148 loops back to block 204, i.e. microcomputer 148 continually checks the communications channel for input from the host computer.

Figure 12:
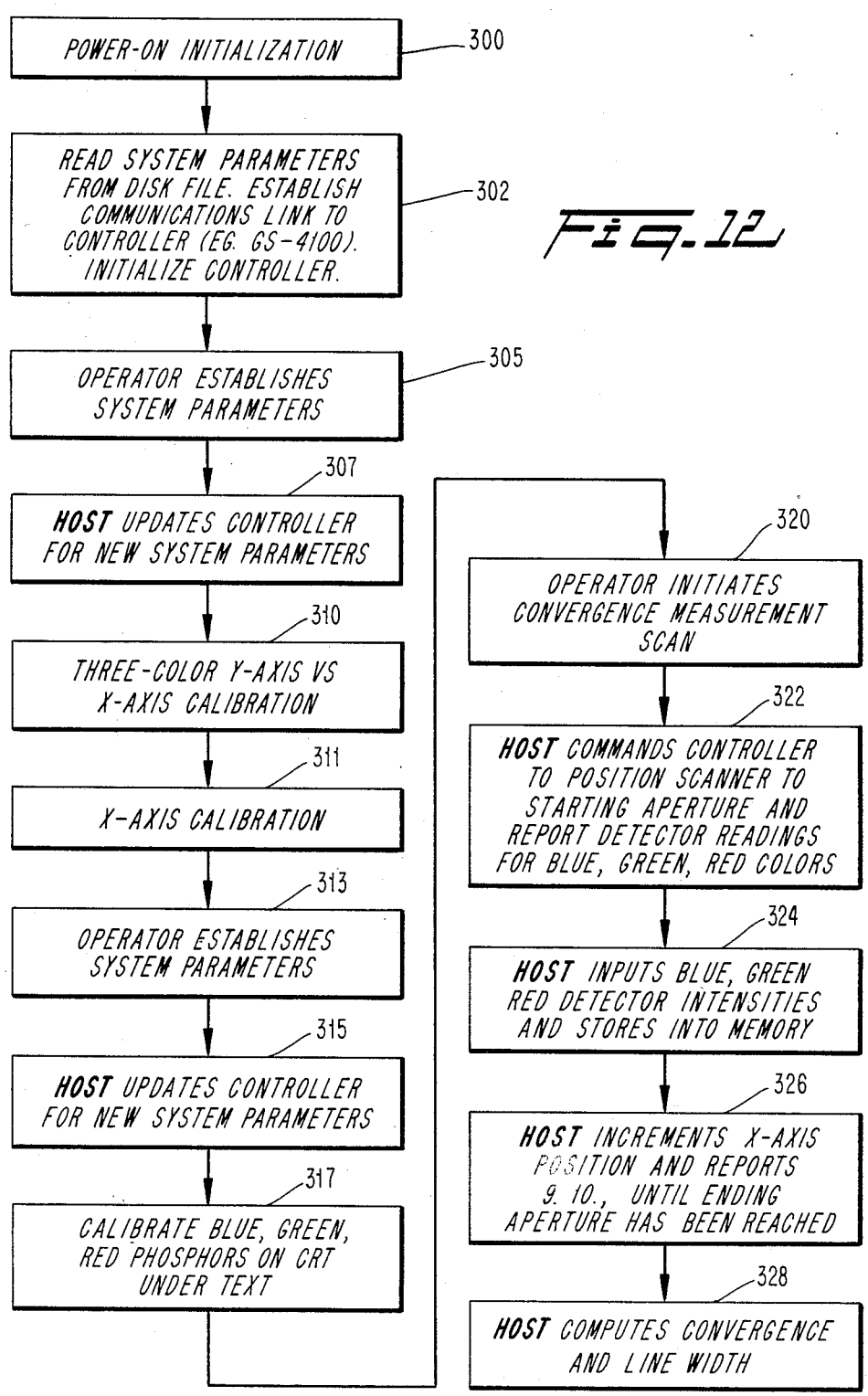
FIG. 12 is a logic flow diagram of instructions contained in the host computer of the system shown in FIG. 6.

The logic flow of instructions contained in host computer 164 for a preferred embodiment of the present invention will now be described, as shown in FIG. 12. Beginning at block 300 with power on initialization, host computer 164 bootstraps the central processing unit operating system, checks memory, and reads real time clock and date into memory.

At block 302, host computer 164 reads and executes a batch file which loads a disk file. This disk file includes system parameters to initialize system variables of control apparatus 136. A communication link is then established between host computer 164 and control apparatus 136. Control apparatus 136 is then initialized by receiving the system parameters over the communications link.

At block 305, the operator establishes system calibration parameters by setting high voltage to the detectors and the number of averages desired in optimizing data.

At block 307, host computer 164 updates control apparatus system parameters by transmitting them over the communications link.

At block 310, three-color Y-axis vs. X-axis calibration is performed. The telemicroscope 170/detector 172 combination is then calibrated to correct for the "cosine-forth" fall-off in intensity of light in the image plane, by sending the necessary commands to control apparatus 136 to allow control apparatus 136 to move the slit aperture over the entire scan range. At each scan increment, the signal from the detectors 130–134 is read.

At block 311, x-axis calibration is accomplished by using a Ronchi target in the image plane and establishing the relationships between the distance moved by the aperture in the image plane to that in the object plane.

At block 313, the operator establishes system measurement parameters by setting high voltage to the detectors and number of averages to optimize measurement data.

At block 315, host computer 164 updates control apparatus system parameters by transmitting them over the communications link.

At block 317, calibration of the blue, green and red phosphors of the CRT under test is performed by calculating the compensation coefficients needed to correct for spectral overlap.

At block 320, the operator initiates convergence measurement scan by first choosing measurement parameters (aperture stepsize, number of data points, etc.).

Figure 11:
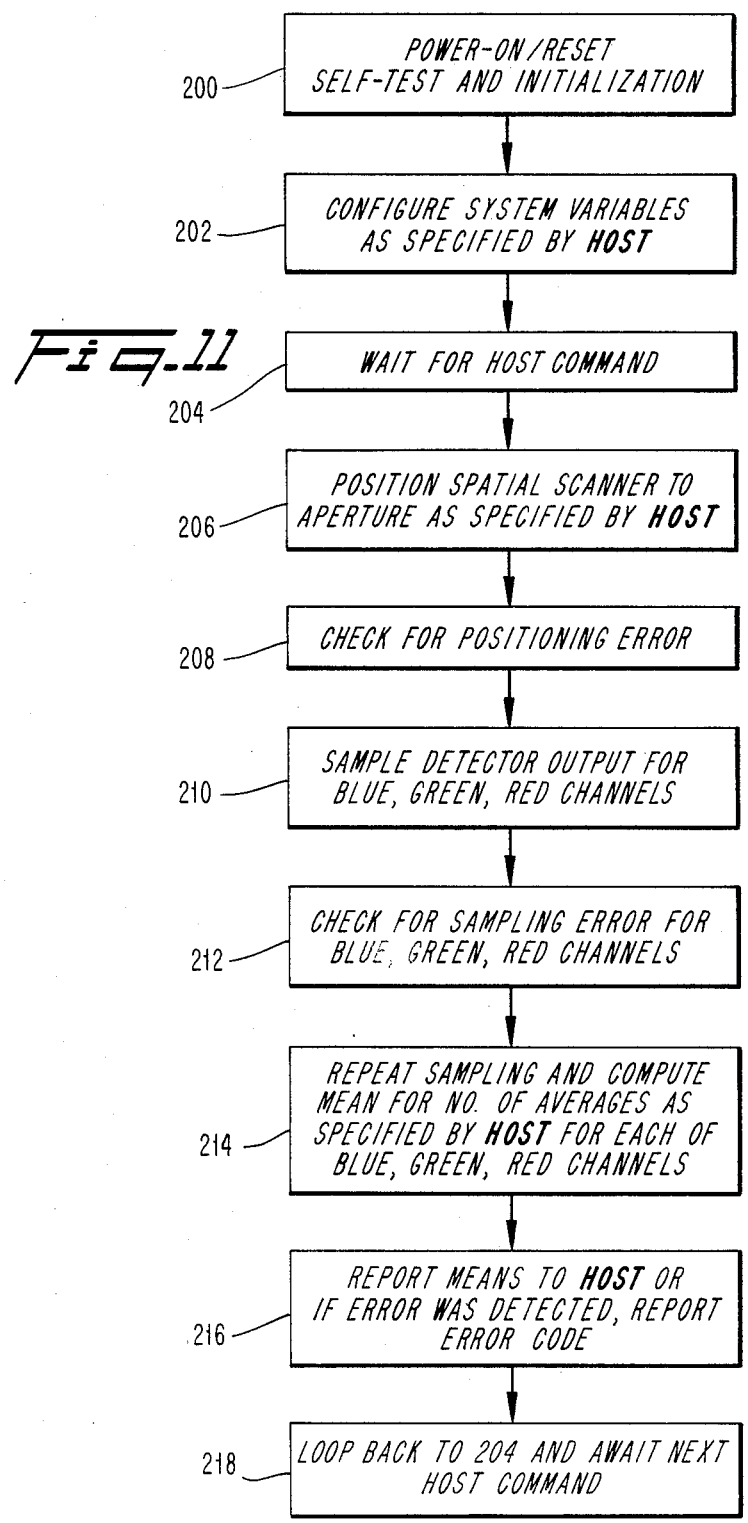
FIG. 11 is a logic flow diagram of instructions contained in the microcomputer of the system shown in FIG. 6.

At block 322, measurement parameters are then transmitted to the control apparatus for a measurement sequence given in FIG. 11

At block 324, host receives inputs from control apparatus 136 and stores intensity values into memory.

At block 326, host computer increments the x-axis position of aperture 112 by transmitting a command to control apparatus 136 and repeats block 324. Block 326 is repeated until the last aperture position is reached and block 324 is repeated for this last aperture position.

At block 328, the host computes the convergence of the three energy beams by computing the centroid of each of the beams after first applying the correction equations 4, 5, and 6. The line width is also determined in block 328 by solution of equations 7, 8, and 9, and all the results are displayed operator.

It will be apparent to those skilled in the art that various modifications and variations can be made in the apparatus and methods of the present invention without departing from the scope or spirit thereof. As an example, the invention is not limited to convergence measurements of triple-beam color CRTs, but may be employed to perform spatial measurements of other types of information display devices such as liquid crystal light valves, plasma display panels, printed color graphics, and other display media which include spatially distributed elements.

The invention may alternatively employ a single detector in combination with a synchronized rotary filter wheel. Moreover, the stepper motor may be replaced with a mechanism for vibrating the knife edge aperture. Thus, it is intended that the present invention cover the modifications and variations of this invention, provided they come within the scope of the appended claims and their equivalents.

What is claimed is:

1. An apparatus for measuring spatial profiles of energy beams, comprising:
   means for generating a radiant energy image representative of the energy intensity of a cross section of a beam to be measured;
   detector means for measuring the intensity of the radiant energy of said image;
   means for supplying the radiant energy of said image along an optical path to said detector means;
   a knife edge aperture positioned in said optical path between said generating means and said detector means;
   means for transversely moving said knife edge aperture across said optical path; and
   processor means connected to said detector means and said moving means for obtaining the integral of said detector means output with respect to the position of said knife edge aperture and for generating an output representative of the spatial characteristics of said beams from said integral.

2. An apparatus as recited in claim 1 wherein said detector means separately measures the intensity of the radiant energy of said image over a plurality of frequency bands.

3. An apparatus as recited in claim 2 wherein said detector means comprises a photomultiplier tube.

4. An apparatus as recited in claim 1 wherein said detector means separately and simultaneously measures the intensity of the radiant energy of said image over a plurality of frequency bands.

5. An apparatus as recited in claim 1 wherein said detector means comprises a plurality of detector devices each having a different spectral response.

6. An apparatus as recited in claim 1 wherein said processor means includes means for curve-fitting said integral to a predetermined mathematical function.

7. An apparatus as recited in claim 6 wherein said predetermined mathematical function comprises a Gaussian function.

8. An apparatus as recited in claim 6 wherein said processor means derives beam line profile data by differentiating said curve-fitted integral.

9. An apparatus as recited in claim 1 wherein said processor means comprises means for computing the spatial coordinate of fifty percent of said integral and for providing said fifty percent coordinate as the centroid of said beam.

10. An apparatus as recited in claim 1 comprising a diffuser positioned in said optical path ahead of said detector means.

11. Apparatus as recited in claim 1 comprising:
    means for diffusing energy supplied over said optical path prior to reaching said detector means.

12. An apparatus for measuring spatial profiles of a pattern of radiation from multiple types of phosphor elements activated by multiple electron beams in a cathode ray tube, comprising:
    detector means for measuring the energy of detected radiation;
    imaging means for supplying said radiation over an optical path from said phosphor elements to said detector means;
    a knife edge aperture positioned in said optical path between said imaging means and said detector means;
    means for transversely moving said knife edge aperture across said optical path; and
    processing means connected to said detector means and said moving means for obtaining the integral of said image energy as a function of position across said image.

13. An apparatus as recited in claim 12 wherein said detector means comprises a photomultiplier tube.

14. An apparatus as recited in claim 12 wherein said detector means is comprised of means selectively responsive to multiple frequencies of detected radiation, and said processing means further comprises means for computing separate integral functions of energy of multiple frequencies of detected radiation.

15. An apparatus as recited in claim 14 wherein said detector means is comprised of a plurality of detector devices each responsive primarily to radiation produced by one of said phosphor element types; and
said processor means comprises means for compensating said detector device output signals for components of said output signals contributed by phosphor element types other than said phosphor element to which said detector device is primarily responsive.

16. An apparatus as recited in claim 15 wherein said compensating means is comprised of means for generating correction coefficients from detector device output signals produced by separately and individually activating said electron beams.

17. An apparatus as recited in claim 14 wherein said detector means is comprised of a plurality of photomultiplier tubes each responsive to a different frequency of radiation.

18. An apparatus as recited in claim 12 wherein said means for moving comprises a stepper motor operable when activated to move said knife edge aperture a predetermined distance and wherein said processor means further comprises means for activating said stepper motor and for storing the integral of said image energy at each position of said knife edge aperture.

19. An apparatus as recited in claim 18, wherein said processor means comprises means for computing the derivative of said integrated energy as a function of position across said image and for providing said derivative as a spatial line profile output.

20. An apparatus as recited in claim 19 wherein said processor means further comprises means for curve fitting said integral to a predetermined mathematical function prior to computing said derivative.

21. An apparatus as recited in claim 20 wherein said predetermined mathematical function comprises a Gaussian function.

22. An apparatus as recited in claim 12 wherein said processor means further comprises means for storing values of said integral of said image energy obtained at predetermined positions of said knife edge aperture extending from a position wherein said image energy is completely blocked from reaching said detector means to a position wherein substantially all of said image energy reaches said detector means.

23. An apparatus as recited in claim 12 wherein said processor means comprises means for computing the spatial coordinate of the fifty percent value of said integral and for providing said fifty percent spatial coordinate as an output value representative of the centroid of said pattern.

24. An apparatus as recited in claim 12 further comprising a diffuser positioned across said optical path ahead of said detector means.

25. Apparatus as recited in claim 12 comprising:
means for diffusing energy supplied over said optical path prior to reaching said detector means.

26. A method for measuring spatial characteristics of a pattern of radiation from multiple types of phosphor elements activated by multiple electron beams in a cathode ray tube, comprising the steps of:
forming an image of said pattern;
supplying energy from said image over an optical path to a detector;
placing a knife edge aperture in said optical path to prevent energy of said image from reaching said detector;
transversely moving said knife edge aperture to permit increasingly greater portions of energy from said image to reach said detector;
integrating the energy received by said detector as said knife edge aperture is moved, to obtain an integral of said energy with respect to position across said pattern; and
generating an output signal representative of the spatial characteristics of said pattern from said, integral.

27. A method as recited in claim 26 wherein the step of integrating comprises the substep of curve-fitting said integral to a predetermined mathematical function.

28. A method as recited in claim 27 wherein said mathematical function comprises a Gaussian function.

29. A method as recited in claim 26 wherein the step of generating an output signal comprises the substeps of:
calculating the centroid of said pattern by determining the spatial coordinate of the fifty percent point of said integral; and
providing said spatial coordinate of the fifty percent point of said integral as an output representative of the centroid of said phosphor pattern.

30. A method as recited in claim 26 wherein the step of generating an output signal comprises the substep of differentiating said integral to obtain the spatial profile of said pattern.

31. A method as recited in claim 26 wherein the step of integrating comprises the substep of separately integrating a plurality of frequency bands of said energy.

32. A method as recited in claim 26 wherein the step of integrating comprises the substep of separately and simultaneously integrating a plurality of frequency bands of said energy.

33. A method as recited in claim 32 wherein said phosphor pattern produces radiation at each of a plurality of phosphor emission frequency bands, each of said phosphor emission frequency bands corresponding to one of said integrating frequency bands.

34. A method as recited in claim 26 wherein the step of moving comprises the substeps of:
repeatedly moving said knife edge aperture a predetermined distance to intermediate positions from an initial position in which said knife edge completely blocks transmission of said energy to said detector to a final position in which said knife edge permits transmission of all of said energy to said detector; and
storing at each intermediate position a value representative of the integrated energy at all proceding intermediate positions.

35. A method as recited in claim 26 wherein the integrating step comprises the substeps of generating a plurality of output signals each corresponding to one of said phosphor element types and storing the values of said output signals as a function of said knife edge movement, said method comprising the additional step of generating compensation coefficients and applying said compensation coefficients to said output signals to compensate for components of said output signals generated in response to radiation from phosphor element types other than said corresponding phosphor element types.

36. A method as recited in claim 35 wherein the compensation coefficient generating substep comprises the substeps of individually activating said electron beams, generating output signals from each of said detector devices while a single beam is activated, and computing said compensation coefficients as ratios of said output signals generated while individual ones of said beams are activated.

37. A method for measuring spatial characteristics of a pattern of radiation from multiple types of phosphor elements activated by multiple electron beams in a cathode ray tube, comprising the steps of:

forming an image of said pattern;

supplying energy from said image over an optical path to a detector;

placing a knife edge aperture in said optical path to prevent energy of said image from reaching said detector;

transversely moving said knife edge aperture to permit increasingly greater portions of energy from said image to reach said detector;

diffusing energy supplied over said optical path prior to reaching said detector;

generating a plurality of detector output signals each corresponding to one of said phosphor element types;

storing the values of said output signals as a function of said knife edge movement;

generating a plurality of compensation coefficients and applying said compensation coefficients to said output signals to compensate for components of said output signals generated in response to radiation from phosphor element types other than said corresponding phosphor element types to obtain integrals of energy from each of said beams with respect to position across said pattern; and generating an output signal representative of the spatial characteristics of said beams from said integral.

* * * * *